Sept. 13, 1938. P. L. DONOVAN 2,129,827
HARROW
Filed Feb. 10, 1937 2 Sheets-Sheet 1
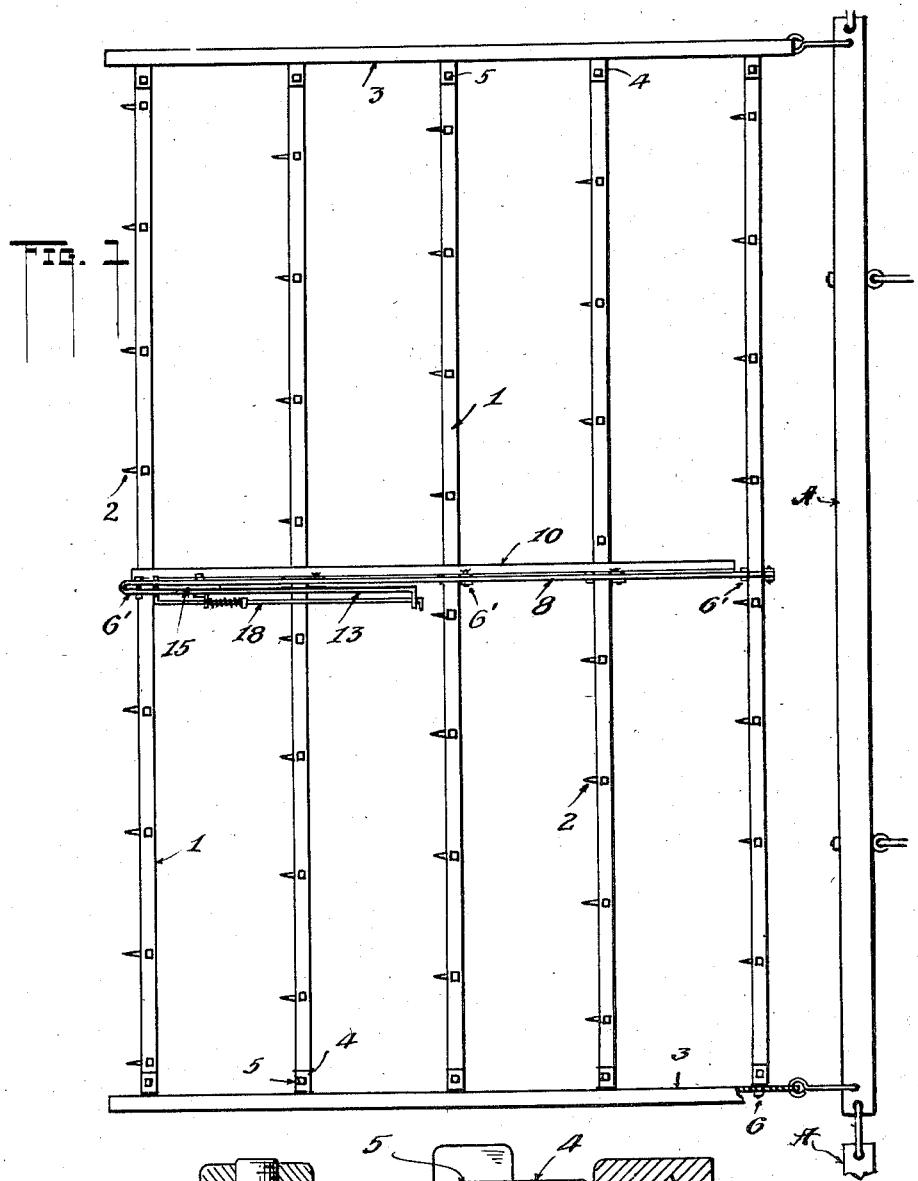
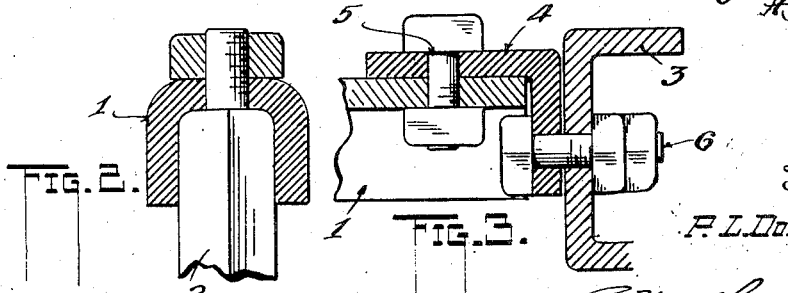
Inventor
P. L. Donovan,
By
Attorney

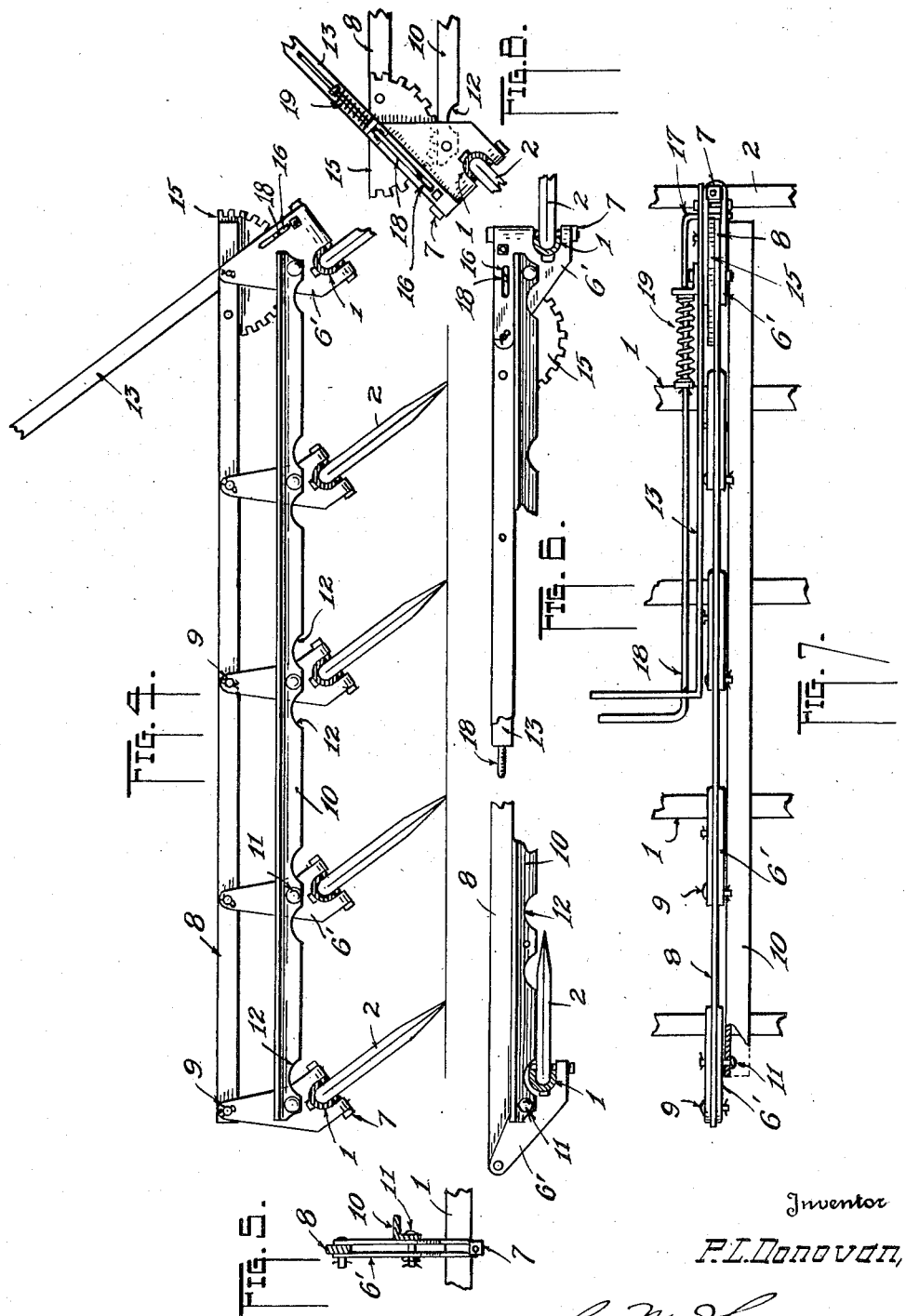

Patented Sept. 13, 1938

2,129,827

UNITED STATES PATENT OFFICE 2,129,827

HARROW

Patrick L. Donovan, Peoria, Ill.

Application February 10, 1937, Serial No. 124,995

7 Claims. (Cl. 55—103)

This invention relates to improvements in harrows. More particularly, the invention has to do with adjusting means for the bars carrying the earth stirring members, or teeth, in this instance.

The main object is that of providing a structure in adjusting means for the harrow-tooth so fashioned and related to the other parts of the harrow as a whole that the operating lever will lie substantially parallel to horizontally extending main parts when the harrow is collapsed for transportation purposes in the field, during shipment, and in storing.

Another object lies in so forming a part of the harrow, or what may be termed a frame-portion thereof, that the bars carrying the harrow teeth will be permitted to rock for permitting the said teeth to parallel the said frame-portion to the end that, together with the operating lever, the whole structure will be compact and have but the smallest possible top to bottom measurement in order that the affair will occupy but the narrowest space in shipping and storage.

Still another object is to so construct harrow sections that there will be no parts that extend beyond either the upper or lower surfaces thereof in the collapsed form of the harrow so that a plurality of such sections may be readily stacked one upon another in close order and so also that they may be shifted relatively if and as required when in the field, or while in storage or while being shipped.

Other objects will appear as the description of the invention proceeds.

In order that the invention in all its details may be clearly understood I have provided the accompanying drawings wherein—

Figure 1 is a plan of a complete harrow-section involving the invention.

Figures 2 and 3 are respectively a transverse, and a longitudinal sectional elevation of certain parts of the harrow structure.

Figure 4 is an elevation of certain operating parts of the harrow according to the invention.

Figure 5 is a transverse sectional elevation of parts of the harrow structure together with a harrow-tooth supporting part in connection therewith.

Figure 6 is a side elevation of some of the parts shown in Figure 4.

Figure 7 is a plan of the structure shown in Figure 4, and

Figure 8 is a side elevation of operating parts shown in Figure 4 as seen from the opposite-side from that of the latter figure.

Heretofore, harrows of the spike-tooth type, or drag type, have been so fashioned that the operating lever thereof, or the notched latch-receiving sector therefor, or both, extend above the plane of the top member or members of the harrow structure so that they create difficulties in folding several sections of the harrow upon one another in the field for transportation of the whole from place to place. These difficulties are also greatly apparent when storing a harrow section, or sections, or in shipment due to the considerable space required for their disposal, in addition to which when parts of the harrow, whether the harrow-teeth or the lever and its sector, project beyond the frame parts they are dangerous to persons working thereon or in the vicinity thereof due to tripping thereon or having the clothing catch thereon, and the sections cannot be readily shifted relatively. In view of these disadvantages I have designed a harrow structure that will lie within the smallest possible space with no projecting part on either the top side or the lower side thereof when in the collapsed form, all of which will be understood herein.

In the drawings, a single harrow section is shown rearward of a draft bar A, while I designates any desired type of tooth-bar which, in this instance only, is of U-form to which harrow teeth 2 are suitably affixed. These bars may be of any number in a given section and their ends lie between and each is pivoted at its end to channel bars 3 for maintaining them in parallelism and allowing tilting or rocking thereof. Figure 3 illustrates the manner of pivotally mounting the tooth-bars wherein one arm of an angle member 4 is secured upon the yoke portion of the bar by means of a bolt 5, for example, and a bolt 6 extends through the other limb of the number and through the channel bar 3 constituting a pivot on which the said tooth-bar may rock.

The character 6' indicates one of a number of tooth-bar levers one of which is bifurcated to receive into it the tooth-bar I and secured thereto by a bolt 7, for example, said lever in this instance being of U-form. That is to say it may be constructed of sheet metal doubled upon itself, the resultant arms lying in spaced relation to each other, the end carrying the bar I receiving the named bolt 7 that retains the latter in place. The spaced opposite ends of the lever receive a bar 8 between them, a pivot member being created by a bolt 9. The lever 6' described may be otherwise constructed, if desired, and it is observed in Figure 4 that the bar 8 has as many of these tooth-bar levers pivoted thereto as there are tooth-bars.

The said levers 6' are each pivoted to and carried by an angle-bar 10, each by a bolt 11 the whole structure described being so appointed that in a movement of the bar 8 longitudinally with respect to the angle-bar 10 all of the tooth-bar levers 6 will be swung and with them the tooth-bars 1 which swing about the bolts 11. In Figure 6 the said longitudinal movement of the bar 8 will carry it closely adjacent the angle-bar 10 in the collapsed form of the device, it being noted that the depending limb of the last named bar is notched at 12 at each side of the pivot bolt 11 to admit the tooth-bar 1, to the end that the whole structure may be collapsed as snugly as possible, the teeth 2 lying parallel to the bars 8 and 10. One of the tooth-bar levers 6', or that at one of the ends of the bar 8, is for convenience, of slightly different form from the others, see Figure 8 particularly, being extended somewhat at one edge for attachment thereto of a hand-lever 13, said lever and the said lever 6' having a common pivot at the bar 8 by the bolt 9 of said lever 6'. Fixed on the said bar 8 is a sector 15, which, it is particularly observed, depends therefrom and lies wholly below it while extending alongside, or by the side of the angle bar 10 in the collapsed form of the device, as shown in Figure 6, and no part thereof lies above any part of the harrow structure at any time.

The lever 6', and the lever 13 as attached to the bar 8 in the present arrangement only, are both slotted at 16 to receive the bent end 17, of a latch-rod 18, which is adapted to engage between the teeth of said sector 15 in any position of the adjustment of the hand-lever. Any means such as a spring 19 serves to maintain the latch in any sector-engaging position.

While the pivot bolts 11 may lie in a lower position on a bar such as 10 so that the tooth-bars 1 could abut the lower edge of such bar in the folded or collapsed position shown in Figure 6, the overall measurement at right angles to the line of said bar 10, i. e., the extreme top to bottom measurement through the harrow, would be much increased, but in such a structure as that shown herein the notches 12 are provided for the reception of said tooth-bars for a more compact arrangement.

The arrangement is such, that when the teeth 2 become worn at one side, or on those sides facing the direction of drag in the field, the bolts 7, may be removed to release the bars 2 whereupon the surmounting structure may be turned end for end the said tooth-bars being replaced so that the unworn tooth surfaces face the direction of travel.

In this reversal of parts the tooth-bars 2 which may enter either one of the pairs of notches 12, of the angle bar 10 adjacent the bolt 11 may now occupy those notches not theretofore entered and the close lying of the parts is maintained in the collapsing operation.

In the field it is common practice to connect several sections of the harrow end to end and drag them from a draft arrangement of foldable parts, the arrangement permitting a very wide strip of territory to be treated.

In transporting such an arrangement from field to field through gateways and other narrow spaces it is the practice to fold the sections and the parts of the draft arrangement upon themselves. When, however, operating levers and other parts extend above the top surface of any section such parts often become interlocked with other portions of the structure causing much trouble, in addition to the fact that the sections must be carefully placed one upon the other in proper balance. If improperly placed it is required that the heavy harrow section be lifted and readjusted because it may, perhaps, have engaged over a part which will not permit shifting but necessitates lifting the sections bodily to place them in proper carrying position. My arrangement obviates any such trouble since the harrow-section-tops are free of any interfering structures or parts.

While I have described a proposed form of parts by which to accomplish the desires herein I may make slight changes such as may lie within the inventive act and within the meaning of the appended claims.

I claim:

1. A harrow whose parts are adapted to be folded or collapsed, including in its construction an upper and a lower bar substantially parallel to each other, harrow teeth operating levers to which said bars are pivotally connected and normally in spaced relation to each other, a latch-carrying operating hand-lever pivotally mounted on the upper of the bars and lying beside the same in line therewith in the folded or collapsed position of said harrow and operatively connected with the lower bar, and a sector fixed relative to the said upper bar and depending below the upper edge thereof, said sector having a position to receive the latch of the hand-lever when the latter lies alongside and substantially parallels said upper bar.

2. A harrow whose parts are adapted to be folded or collapsed including in its construction an upper and a lower bar normally spaced apart, harrow tooth operating levers connecting the bars and to which the latter are pivoted, a single part latch-carrying hand-lever pivotally mounted between its ends on the upper of the bars between the edges thereof and in one of its positions of adjustment paralleling said bar, said lever having operative connection with the lower bar and adapted in its swing to shift the named bars in opposite directions, and a sector fixed relatively to the upper bar at said hand lever and depending below the upper edge of such bar, certain of the teeth of the sector lying in position to receive the latch of said lever in the named position of the latter when the parts of the harrow are in the folded or collapsed position.

3. A harrow of the drag type the parts of which are adapted and arranged to fold or collapse in close order, the same including in its construction an upper and a lower bar lying substantially parallel to each other, harrow tooth carrying levers pivoted to and connecting the bars, a latch-carrying hand lever mounted on the upper of the two bars, its pivot lying in position at said bar to permit said lever to lie beside and substantially in line with the bar in the folded position of the parts of the harrow, said lever having operative connection with the lower bar, and a sector fixed with respect to the said upper bar and extending in the general direction of the lower bar, certain of the teeth of the sector lying in position to receive the latch of the lever in the named position of the latter for fixing the harrow parts relatively, the named upper and lower bars lying closely adjacent each other in the folded position of the harrow, and the harrow teeth lying substantially parallel with the bars in said folded position.

4. A harrow of the drag type the parts of which are adapted and arranged to fold or collapse in close relation, the same including in its construction an upper and a lower bar lying substantially parallel to each other, levers pivotally attached to and connecting the bars, harrow teeth fixed with respect to and operated by the levers, said teeth lying at an angle of substantially 45° to the longest measurement of the said bars when the latter are at their widest spread, a latch-carrying hand operated lever pivoted on the upper of the two bars and operatively connected to the lower bar, and said lever in the folded position of the parts lying in line with said upper bar, a sector depending from the upper bar at said lever, certain of the teeth of the sector engaging said latch in the named position of the lever, the said bars and the harrow teeth all lying parallel to each other in close relation in said folded relation of the harrow parts.

5. A harrow of the drag type the parts of which are adapted and arranged to fold or collapse in close relation, the same including in its construction an upper and a lower bar lying substantially parallel to each other, levers pivotally attached to and connecting the bars, tooth bars affixed to the levers and including harrow teeth mounted thereon, a latch-carrying hand operated lever pivoted with respect to the upper bar adapted to substantially parallel the same in the folded position of the parts of the harrow and operatively connected to the lower bar, a sector fixed on said upper bar and depending wholly below it, the latch of said lever in the named position of the latter adapted to engage the teeth of said sector for securing the harrow parts in their folded positions, the named lower bar having notches to receive the tooth bars in said folded position.

6. In a harrow, a structure including a rockable bar including harrow teeth carried thereby, a lever of U-form provided with a recess directed transversely of the yoke portion thereof to engage over said bar, a bolt lying between the limbs of the lever substantially at right angles to the longitudinal line of said bar and extending beneath said bar securing the same and the lever relatively.

7. In a harrow, a structure including rockable bars carrying harrow teeth, a lever of U-form for each bar, each provided with a transverse notch in the yoke portion thereof to engage over one of the bars, a bolt extending between the limbs of each lever at right angles to the longitudinal line of the bar and engaging beneath the same securing it in said recess, a bar pivotally connecting the levers at positions adjacent the first named bars, and a second bar pivotally connecting the levers at a position remote from the first named bar.

PATRICK L. DONOVAN.